(12) United States Patent
Davies et al.

(10) Patent No.: US 9,137,831 B2
(45) Date of Patent: Sep. 15, 2015

(54) METHOD FOR INSTALLING A FEMTOCELL ACCESS POINT

(75) Inventors: Robert Davies, Milton (GB); Timothy Moulsley, Caterham (GB); Choo Chiau, Cambridge (GB)

(73) Assignees: Koninklijke Philips N.V., Eindhoven (NL); Sharp Kabushiki Kaisha, Osaka (JP)

( * ) Notice: Subject to any disclaimer, the term of this patent is extended or adjusted under 35 U.S.C. 154(b) by 138 days.

(21) Appl. No.: 13/879,646

(22) PCT Filed: Nov. 4, 2011

(86) PCT No.: PCT/IB2011/054928
§ 371 (c)(1),
(2), (4) Date: Apr. 16, 2013

(87) PCT Pub. No.: WO2012/066448
PCT Pub. Date: May 24, 2012

(65) Prior Publication Data
US 2013/0223284 A1      Aug. 29, 2013

(30) Foreign Application Priority Data
Nov. 15, 2010   (EP) ..................................... 10306251

(51) Int. Cl.
*H04W 76/02*      (2009.01)
*H04W 60/00*      (2009.01)
*H04W 24/02*      (2009.01)
*H04W 28/18*      (2009.01)
*H04W 84/04*      (2009.01)

(52) U.S. Cl.
CPC .............. *H04W 76/02* (2013.01); *H04W 60/00* (2013.01); *H04W 24/02* (2013.01); *H04W 28/18* (2013.01); *H04W 84/045* (2013.01)

(58) Field of Classification Search
None
See application file for complete search history.

(56) References Cited

U.S. PATENT DOCUMENTS

| | | |
|---|---|---|
| 2005/0148368 A1 | 7/2005 | Scheinert et al. |
| 2006/0218282 A1* | 9/2006 | Teinila et al. .................. 709/227 |
| 2007/0064649 A1* | 3/2007 | Makela et al. ................. 370/331 |
| 2008/0207170 A1 | 8/2008 | Khetawat et al. |
| 2009/0170520 A1 | 7/2009 | Jones |
| 2009/0215477 A1* | 8/2009 | Lee et al. ....................... 455/466 |
| 2009/0305671 A1 | 12/2009 | Luft et al. |
| 2010/0016022 A1 | 1/2010 | Liu et al. |
| 2010/0296441 A1* | 11/2010 | Barkan ......................... 370/328 |

\* cited by examiner

*Primary Examiner* — Chi H Pham
*Assistant Examiner* — Shick Hom

(57) ABSTRACT

A method installing a femtocell device in a radiotelecommunications network, wherein the femtocell device receives from a mobile telecommunication device a set of parameters for connecting the femtocell device to a network access device that provides an access to an Internet Protocol network and connects to a management unit of the radiotelecommunications network, through the Internet Protocol network access, in order to be integrated to the radiotelecommunications network under control of the said first management unit.

22 Claims, 4 Drawing Sheets

METHOD FOR INSTALLING A FEMTOCELL ACCESS POINT

TECHNICAL FIELD

The present invention relates to a method of installing a femtocell access point. The present invention also relates to a femtocell access point device and a computer program product related to said method.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

According to the 3GPP (3rd Generation Partnership Project) standard, a Home Node-B (HnB) or Home enhanced Node B (HeNB) is a device installed in a customer's premises that offers a coverage area to telecommunication devices in order to connect them to an operator's network via a broadband IP (Internet Protocol) backhaul. The Home Node-B (HnB) or Home enhanced Node B (HeNB) thus offers access to the operator's network via a "Universal Terrestrial Radio Access" air interface (UTRA in 3G networks, or EUTRA in Long Term Evolution (LTE) networks) to 3GPP User Equipments (UEs).

Home Node-Bs (HnB) or Home enhanced Node Bs (HeNB) operate as small cellular radio base stations, substantially indistinguishable to the UE from a wide area base station and which is maintained by the network operator but installed by the customer and located on his premises (residential, commercial (shopping malls), etc.)

The concept of a 'femtocell' is similar. However, the femtocell concept is not restricted to the 3GPP standard and femtocells may be based on other standards such as the CDMA2000 or WiMAX standards. The expression 'Femtocell Access Point' (FAP) may refer to the physical hardware that implements the air interface and the expression lemtocell' may refer to the associated area of service provided by it.

For the operator, the femtocells should not disrupt or otherwise interfere with the operation of fixed cellular infrastructures in existence either currently or in the future. For the customer, the FAP should be easy to install, require minimal maintenance and provide adequate coverage of the premises.

These characteristics may be addressed by providing the core network, via the broadband IP backhaul, with complete control over the operation of the FAP and the associated femtocell. The network may then undertake an installation process for the FAP that attempts to establish the FAP's place within the network before the FAP is allowed to make a transmission. Thus, once the FAP is powered up and has established a connection to the network, the network may establish the location of the FAP relative to other cells and to define a suitable operating envelope.

For example, the following set of actions may be performed:

Instruct the FAP to scan for other nearby radio cells and report signal strength and other measurements (This may include instructions to listen for specific cell sites),
Use this information to derive an (approximate) location for the FAP,
Instruct nearby terminals (UEs) to report their own measurements in order to provide information on cell sites that the FAP itself cannot receive (This may allow 'hidden node' problems to be pre-empted),
Use this extra information to derive a set of timings, operating channels, power levels and other operating parameters that the FAP may use without causing disruption to existing facilities, and
Repeat measurements and adjust operational parameters as necessary during the operational life of the FAP.

Variations on the actions can be envisaged. For instance, in some regulatory environments, it might be required that the FAP establishes its location directly by using a service such as GPS. In other circumstances, some channels licenced to an operator might be dedicated to femtocells, others to macro cells, with consequent modifications to scanning, reporting and other processes involved in setting the operating parameters of the FAP.

Hence, a practical issue with the installation of a FAP may be the provision of a connection to a local IP backhaul service.

In residential premises, for example, this might involve coupling the FAP to an xDSL modem, a cable modem or some other form of broadband gateway. IEEE 802.3 Ethernet may be used to provide a wired connection between access point and peripheral (possibly via a router or other local distribution system) although other cable-based systems such as FireWire and USB are possible carriers.

For example, FAP products may have provision for connection to the broadband gateway via a short range wireless connection. However, a problem that has to be resolved is configuration of the FAP's short range wireless port to match that of the short range wireless access point supported by the broadband gateway. For a WiFi port, for example, it may be necessary to select the desired wireless access point from a list of those that can be received and then enter security codes for WEP, WPA or WPA2 protocols. This requires either some form of user interface on the FAP or a wired service port (often USB) to enable configuration by a PC. One (if not both) may be costly, the other may be inconvenient to use.

Thus, there is a need for a method of installing a femtocell access point that limits the user's intervention.

SUMMARY OF THE INVENTION

According to a first aspect of installing a femtocell device in a radiotelecommunications network, the method comprising the following steps performed by the femtocell device:

receiving from a mobile telecommunication device, a set of parameters comprising at least one connection parameter for connecting the femtocell device to a network access device that provides an access to an Internet Protocol network, the connection being a wireless connection,
connecting to the network access device according to the received set of parameters, and
connecting to a management unit of the telecommunications network, through the Internet Protocol network access, in order to be integrated to the telecommunications network under control of the said first management unit.

The set of parameters may be directly received from the mobile telecommunication terminal. In such embodiments, the wireless interfaces of the telecommunications terminal may be used to transfer the parameters. For example, the wireless interfaces include NFC or RFID variants.

Hence, if the FAP is located in an area of poor reception (a possible motivation for installing it in the first place), the parameters may be transferred without the need of core network.

Alternatively, the set of parameters may be received though a base station of the telecommunications network. In such embodiments, the transfer of the necessary parameters from the telecommunications terminal to the FAP may be performed through the operator's core network.

For example, the set of parameters is received through a communication link between the base station and the femtocell device.

For example, the set of parameters is obtained through a listening of a communication between a telecommunication terminal and a base station of the telecommunications network.

A telecommunication terminal, such as a mobile phone, already has the necessary user interface with which to record the necessary parameters (such as WiFi configuration data). It can thus be used, without the need of a dedicated interface on the femtocell device.

The present invention may be implemented in UMTS, LTE, LTE-A or other communication systems.

Also, in case the telecommunication terminal already uses the wireless communication, the parameters may already be recorded without the need for the users to record them).

According to a second aspect of the invention, there is provided a computer program product comprising instructions for implementing the meshing method according to at least one of the embodiments of the invention when loaded and run on computer means of femtocell access point device.

According to other aspects of the invention, there are provided femtocell access point devices and a telecommunication system comprising means for implementing methods according to at least one embodiment of the invention.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Figure 1:
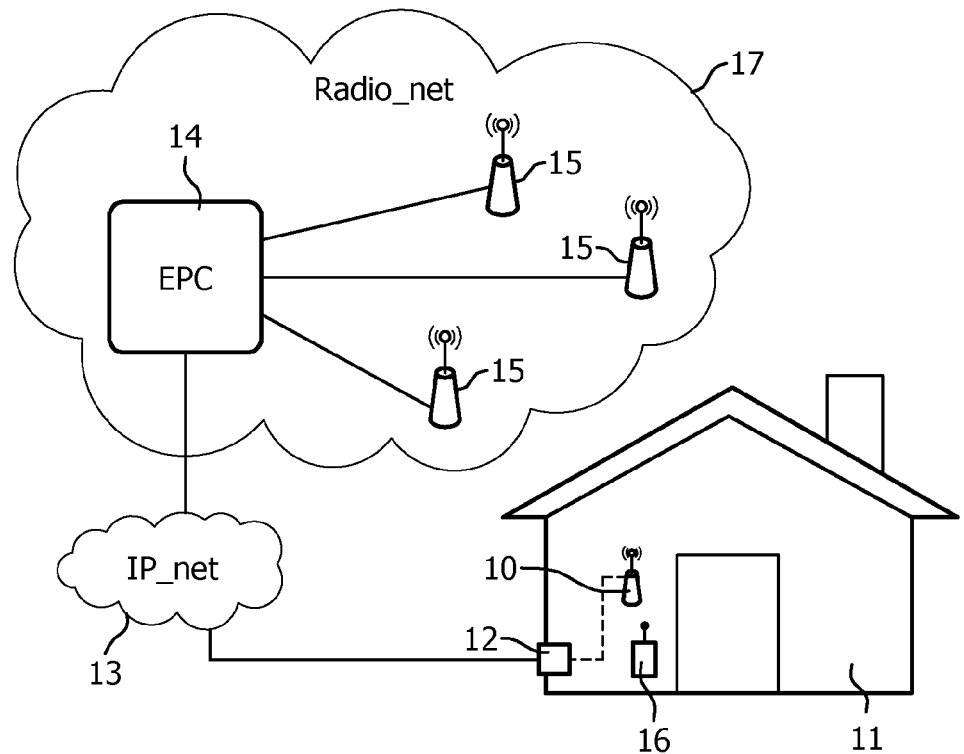
FIG. 1 is a schematic illustration of general context of implementation of embodiments of the invention.

FIG. 1 shows a femtocell device 10 (or Femtocell Access Point, FAP in the following), located in the premises 11 of a user (not represented). The FAP is connected to an Internet access device 12, such as a gateway or a modem. The internet access device enables to access an Internet Protocol (IP) network 13.

The femtocell is integrated to a radiotelecommunication network 17 that enables mobile telecommunication terminals to perform mobile telecommunications. The radiotelecommunication network has a management unit 14 that may be the operator's Evolved Packet Core (EPC in the following). The EPC can remotely configure the FAP for integrating it to the radiotelecommunication network and manage the communications involving the FAP. The radiotelecommunication network further comprises base stations 15, such as node Bs or e-node Bs for offering the coverage of the network.

According to embodiments of the invention, in order to connect to the Internet access device, the FAP may receive connection parameters from a mobile telecommunication terminal 16. The mobile telecommunication terminal may transmit the parameters to the FAP directly or indirectly, using the telecommunication network provided by the EPC and the base stations.

Figure 2:
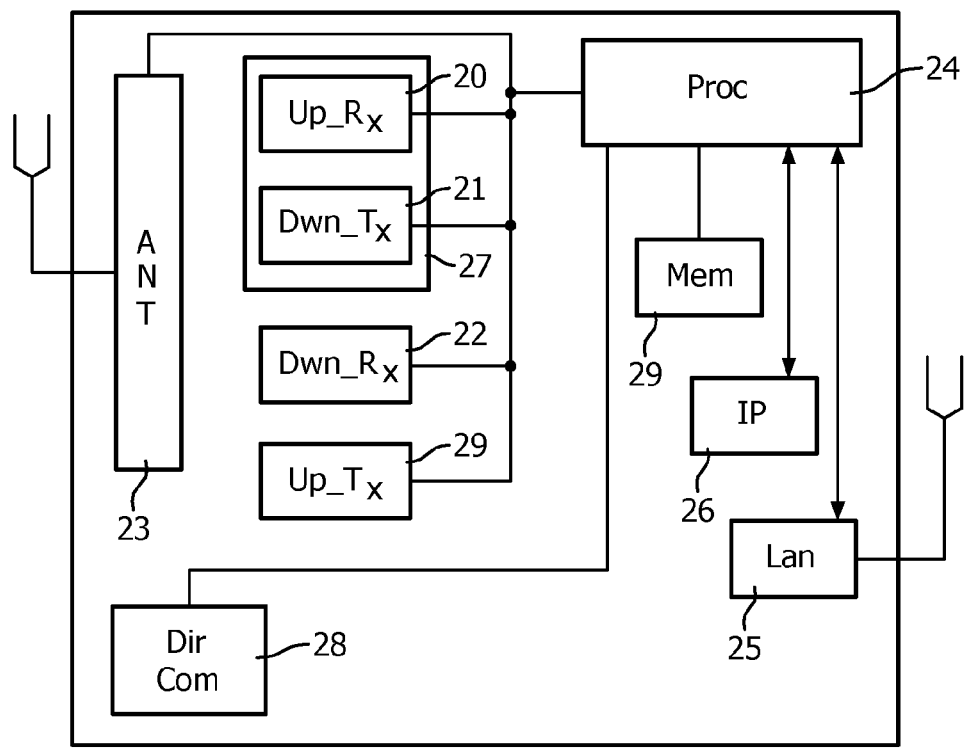
FIG. 2 is a schematic illustration of a femtocell device according to embodiments.

As illustrated by FIG. 2, a FAP device may comprise one or several of the following elements, according to the method used for installing the FAP device, as it will be apparent to the person with ordinary skill in the art in the light of the embodiments described hereafter:

- a cellular wireless uplink receiver 20,
- a cellular wireless downlink transmitter 21,
- a cellular wireless downlink receiver 22 (for receiving transmissions from other (e)Node Bs),
- a cellular uplink transmitter 29 (for transmitting data to other (e)Node Bs and establishing communication links),
- an antenna system 23,
- a data-processing unit 24,
- a memory unit 29,
- a short range wireless LAN 25,
- an IP backhaul interface 26, and
- a direct transfer unit 28 for receiving data directly from a mobile telecommunication terminal.

The processing unit is configured for implementing a method according to embodiments of the invention. The processing unit may comprise a dedicated circuit configured for implementing a method according to embodiments. The memory unit may comprise several types of memory. For example, the memory unit may comprise a memory for storing processing data. The memory unit may also comprise a memory for storing a computer program according to embodiments of the invention.

The cellular wireless uplink receiver, the cellular wireless downlink transmitter and the antenna system are arranged as a first radio system 27 to operate as a conventional cellular radio cell in accordance with a first cellular wireless radio standard.

The cellular downlink receiver is arranged to operate as a second, auxiliary cellular radio system in accordance with said first cellular radio standard. Said second radio system may share the antenna system of the first radio system or may be arranged to use a separate antenna system.

Multiple channel techniques, including but not limited to MIMO may be implemented by deploying multiple instances of said radio components as necessary. In the following, a single antenna system is used.

The direct transfer unit is arranged to receive data from a mobile telecommunication terminal using for example infrared light communication means, RFID means or the like.

Connection of the FAP to the telecommunication network (Core Network, CN in the following) is achieved via an IP-based backhaul that may be implemented using such technologies as xDSL, Fibre to the Home (FTTH), cable modem and so on.

In the following, we assume that an IP backhaul modem, that acts as a broadband gateway to said IP-based backhaul is installed in the customer premises and that the FAP is connected to it by some means to be discussed hereafter.

Figure 3:
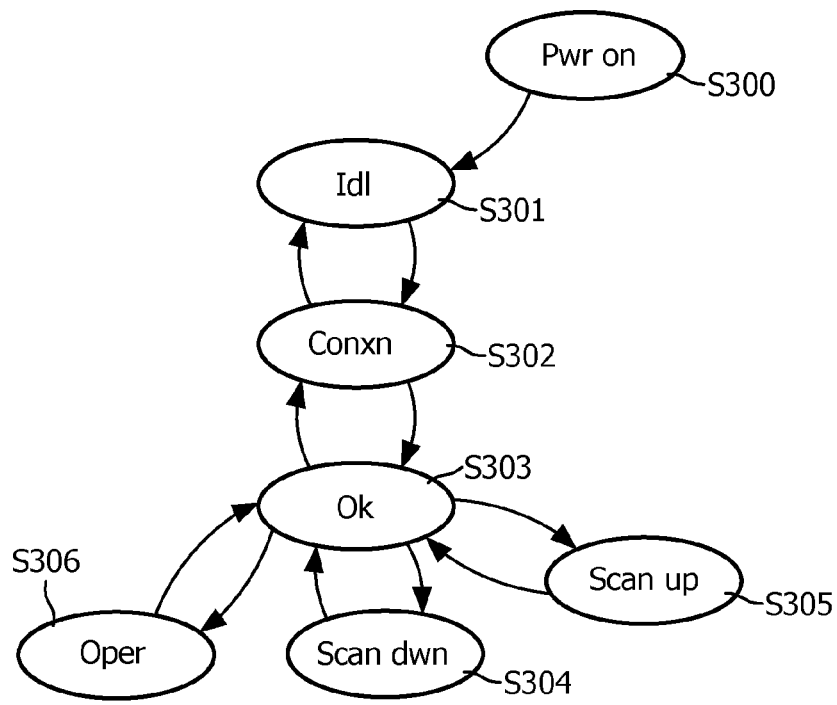
FIGS. 3-4 are schematic state diagrams of femtocell devices according to embodiments.

Considering the FAP in totality, we may suppose the following exemplary operational states, illustrated in FIG. 3:

Power on reset S300,
Idle S301,
Establishing backhaul connection S302,
Backhaul established S303,
Scanning downlink S304,
Scanning uplink S305, and
Operational S306.

The power on reset state corresponds to the activation of the FAP, for example by pressing a dedicated button on the FAP. In this state, the FAP performs a power up cycle in order to make is operating functions ready.

Once the power up cycle performed, the FAP is in an idle state before the connexion to the IP backhaul is triggered.

When the IP backhaul connexion is triggered, the FAP enters the connexion state S302 wherein it performs the necessary step for getting access to the internet network via an IP backhaul connexion. For example, the FAP connects to a WIFI IP access device, as it will be further described.

Once the connection is established, the FAP enters the connected state S303

Then, FAP attempts to establish a connection to the mobile operator's network (for example to the EPC) via the backhaul. It then remains in the idle/backhaul established state, awaiting further instructions from the network. The remaining states S304, S305 and S306 are then deployed under control of the mobile operator for integrating properly the FAP to the operator's network.

Although for the sake of simplicity this is not shown in the diagram of FIG. 3, the scanning states may be entered, perhaps as a parallel process, from at least the operational state in addition to the said idle/backhaul established state.

The interface between the FAP and the backhaul modem may be implemented in a number of ways and practical systems may support more than one type of interface.

For example, the FAP/backhaul modem interface is implemented by a short range wireless radio system. A first short range wireless transceiver, operating in accordance with a standard protocol like, for example, a member of the IEEE 802.11 family, is physically connected to and is logically part of the FAP. A second short range wireless transceiver is similarly associated with the backhaul modem.

Figure 4:
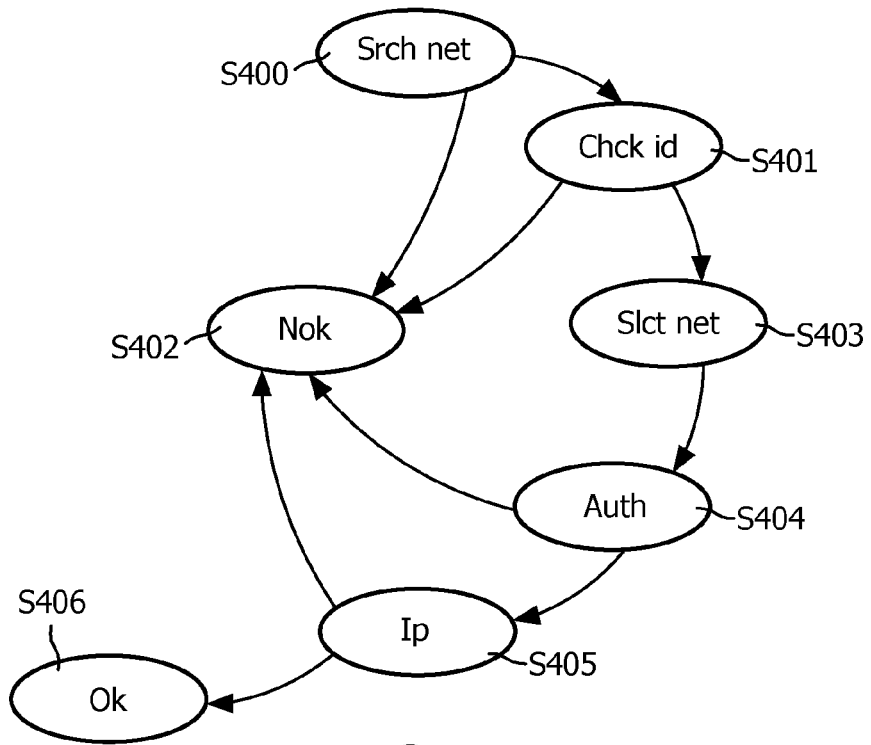

In order to establish said normal operation, the first wireless transceiver associated with the FAP has to be configured with information necessary to enable it to communicate with the second wireless transceiver associated with the modem. In the exemplary case of transceivers operating in accordance with the WiFi protocol this process can be represented by the exemplary state diagram in FIG. 4.

When the connection to the IP network is activated, the FAP enters a searching state S400 wherein it searches available networks, for example WIFI networks.

If no network is found, the FAP enters a failure state S402, indicating that no network could have been found.

If at least one network is found, the FAP enters the checking state S401 wherein valid networks are filtered among the networks found. If no valid network is found, the FAP enters the failure state S402.

If at least one valid network is found, the FAP enters the selection state S403 wherein a valid network is selected.

When a valid network is selected, the FAP enters the authentication state S404 wherein if performs the security and authentication actions needed for accessing to the selected valid network.

If the authentication fails, the FAP enters the failure state S402.

If the authentication succeeds, the FAP enters the address allocation state S405, wherein it obtains an IP address for communicating through the IP network.

When the IP address is obtained, the FAP enters the connected state S406, wherein it is able to communicate through the network.

If no IP address could have been obtained, the FAP enters the failure state S402.

During the process, several sets of information may be needed that can be supplied from an external source:
the choice of beacon, and
the additional parameters needed to gain access.

For the example of WiFi and depending on the network configuration and security level, these credentials may include the following parameters:
a network name (Service Set Identifier (SSID)),
a WEP (Wireless Equivalent Privacy) key,
a WPA (WiFi Protected Access) or WPA2 key, and
a static IP address.

Other parameters may be included and other short range wireless technologies may require a similar or different set of parameters.

In the following, there are described several embodiments for providing the parameters (or credentials) to the FAP.

In a first embodiment, the FAP comprises a cellular wireless downlink receiver and a cellular wireless uplink transmitter and can therefore emulate a terminal and establish a two-way dialogue with a macro cell.

In a second embodiment, the FAP does not comprise a cellular wireless uplink transmitter and the credentials are provided via the cellular wireless downlink receiver. In this embodiment, the FAP can enter the scanning downlink state (for example as a parallel process) from at least one of the idle and the establishing backhaul states.

In third embodiment, the credentials may be supplied via a cellular wireless uplink receiver.

In a fourth embodiment, the credentials may be supplied via an alternative wireless access mechanism, such as NFC, RFID or IrDA.

These embodiments are now described in more detail.

First Embodiment: Use of a cellular wireless downlink receiver and a cellular wireless uplink transmitter The FAP possesses the necessary cellular wireless uplink transmitter to enable it to emulate a conventional terminal and respond in accordance with said standard procedures. On successful completion of the link establishment procedure, the linked wide-area cell may then issue a secure higher layer message to the FAP that contains the credentials necessary to establish the local wireless link.

Figure 5:
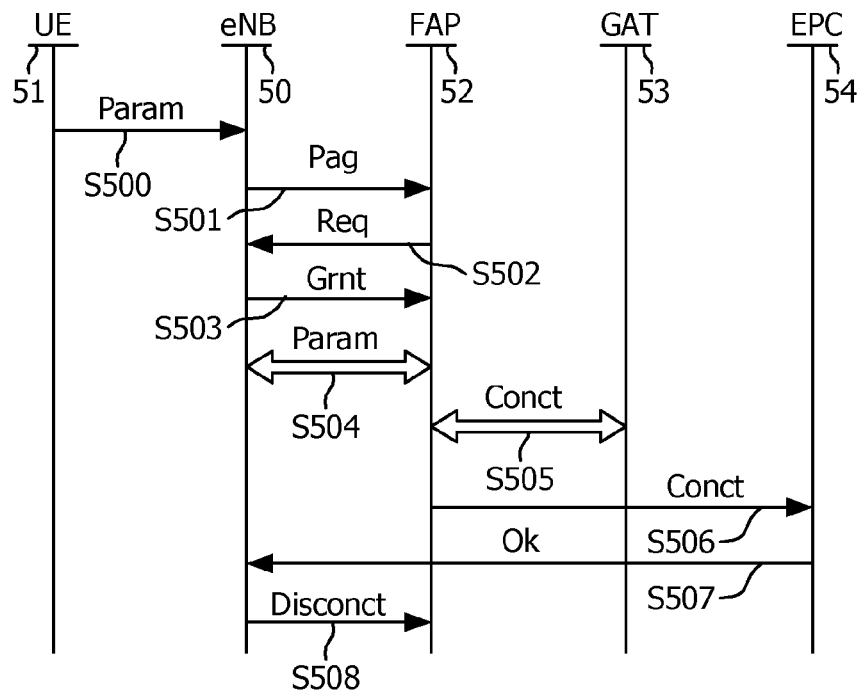
FIG. 5 is a schematic flow chart depicting steps of methods according to a first embodiment.

In the present embodiment, the method comprises the following steps, described with reference to FIG. 5.

In a first step S500, a user of the FAP sends parameters needed for configuring a WIFI communication between the FAP 52 and the internet access device 53 (Gateway). The user sends the parameters to a base station 50 using a communication terminal 51. For example, the user transmits an SMS message (Short Message Service) to a dedicated address provided by the network operator and the base station corresponding to the nearby macro cell adjudged to be closest to the FAP.

Then, during step S501, the base station issues a page message to the FAP. For example, the FAP has a terminal (or UE) identity that is known to the network and the page message is addressed to the FAP's terminal identity in accordance with the standard procedures for the system protocol in operation.

On receipt, the FAP emulates a normal terminal behaviour and establishes a link with the base station order to find out the reason for the paging message. The FAP requests the establishment of the link during step S502 and receives a confirmation that the link is established and the communication granted during step S503.

Once the link is established, the base station transfers the parameters to the FAP during step S504.

Then, the FAP has the necessary parameters for establishing the connection to the Gateway 53, and establishes the connection to the Gateway during step S505.

Once the connection to the gateway is performed, the FAP has access to the Internet network and is thus able to connect to the EPC 54 of the operator's network. The FAP then connects to the EPC during step S506. Then, the FAP is integrated to the operator's network under the control of the EPC as already discussed above.

In order to release the communication link established between the FAP and the base station, the EPC may send a message to the base station during a step S507 that informs that the FAP successfully contacted the EPC.

On receipt of the message, the base station releases the link by sending an appropriate message to the FAP during step S508.

Second Embodiment: Use of cellular wireless downlink receiver The purpose of the cellular wireless downlink receiver is to enable the FAP to scan for the presence of neighbouring cells (Node Bs or eNode Bs for example). Since this receiver needs to be capable of deriving cell identity information, it is also capable, in principle, of receiving information delivered to it in a connectionless fashion that does not require dialogue with the FAP (e.g. broadcast or unicast fashion).

In this embodiment, the FAP doesn't use any cellular wireless uplink transmitter and cannot therefore emulate a conventional terminal. This may be due to the fact that the FAP is not equipped with a cellular wireless uplink receiver.

In the present embodiment, the said at least one nearby wide area cells will transmit said credentials using a broadcast or connectionless mechanism that does not require dialogue with the FAP. In the case of LTE, for example, the MBMS service may provide a suitable mechanism. The page message is thus treated by said FAP as an invitation to seek the broadcast or connectionless channel in accordance with appropriate procedures. Completion of this process is signalled when said FAP is able to use the downloaded information to establish a link to the core network via the local wireless interface. An aspect of said broadcast or connectionless process may be the transmission of the credentials in a secure manner, yet negotiation of a secure channel is not possible. Instead, since the FAP is known to the network, a mechanism based on a priori knowledge can be used. By way of non-limiting examples, a method based on shared secret keys or a method based on public key cryptography may be used.

Figure 6:
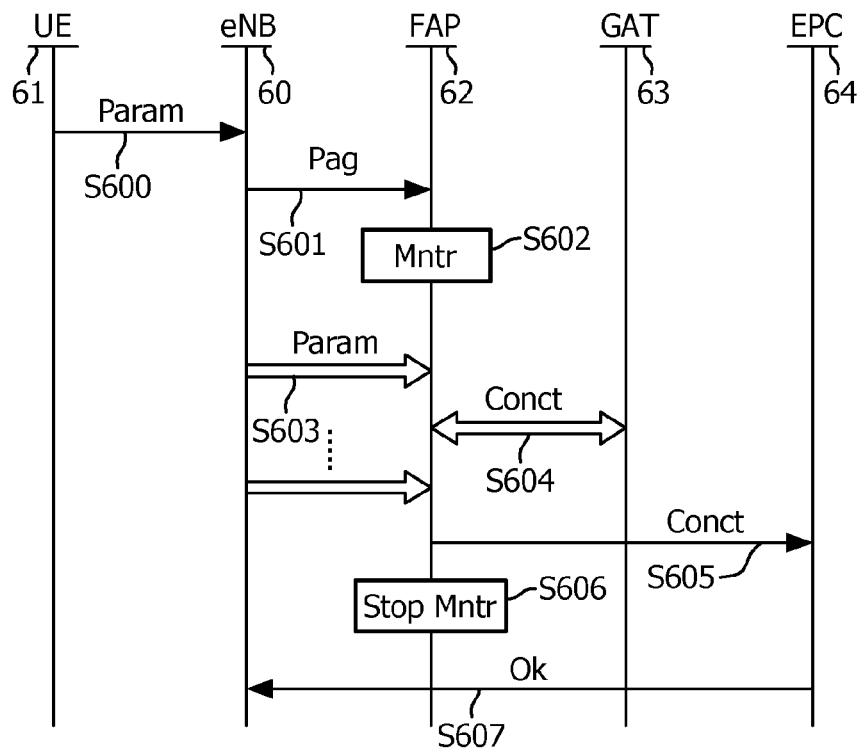
FIG. 6 is a schematic flow chart depicting steps of methods according to a second embodiment.

In the present embodiment, the method comprises the following steps, described with reference to FIG. 6.

In a first step S600, a user of the FAP sends parameters needed for configuring a WIFI communication between the FAP 62 and the internet access device 63 (Gateway). The user sends the parameters to a base station 60 in using a communication terminal 61. For example, the user transmits an SMS message (Short Message Service) to a dedicated address provided by the network operator and the base station corresponding to the nearby macro cell adjudged to be closest to the FAP.

Installation can proceed at the convenience of the customer. For example, a FAP installation program may be installed on the user's mobile terminal that requires the wireless parameters to be entered (or selected from a list of wireless stations currently receivable by the terminal or previously stored) and, optionally, the FAP identity. Then the program may send the parameters via the SMS message.

If the FAP is already available to the core network via an existing IP backhaul network, the message may be ignored.

Otherwise, during step S601, the base station issues a page message to the FAP. For example, the page message comprises a channel identification for indicating to the FAP what channel to monitor in order to receive the parameters.

On receipt, during step S603, the FAP triggers a downlink monitoring of the channel.

Also, the base station begins the step S604 during which the parameters are transferred via downlink to the FAP.

Then, when the FAP has received the necessary parameters for establishing the connection to the Gateway 63, it establishes the connection to the Gateway during step S604.

Once the connection to the gateway is performed, the FAP has access to the Internet network and is thus able to connect to the EPC 64 of the operator's network. The FAP then connects to the EPC during step S605. Then, the FAP is integrated to the operator's network under the control of the EPC as already discussed above. The FAP also stops the monitoring of the channel during step S606.

When the EPC is contacted, it sends a message to the Base station during step S607 in order to inform the base station that the transfer of the parameters is not needed any longer and that it can stop the transfer.

Third Embodiment: Use of cellular uplink receiver
The FAP acquires credential information via its uplink receiver from a terminal transmission.

An assumption may be that the FAP cannot necessarily receive the transmissions from a base station because of poor propagation paths (which may be one of the motivations for installing a FAP).

It must therefore rely on receiving the necessary data from a terminal but, since it is not yet permitted to employ its downlink transmitter, it cannot function as a cell and therefore must listen in on an exchange between said terminal and a second cell. The said terminal, by comparison, must be in range of both said FAP and said second cell.

An exemplary scenario might involve the terminal operating at a window of a residential building, in range of an external, perhaps weakly-received cell and the internal femtocell.

Since a great deal of thought normally goes into securing and preventing eavesdropping of point-to-point cellular links, this approach may well be regarded as ideologically unsound in some quarters.

It should therefore be pointed out that the said second cell is always in control both of the exchange between it and the terminal and of the information that is 'leaked' by the terminal to the FAP. Furthermore, the 'leaked' information is secured both in order to prevent eavesdropping by an unauthorised party and in order to allow the FAP to check the integrity of the data.

Since lack of reception of macro cells would imply that the FAP may not be synchronised with said macro cells, use of random access uplink procedures would seem most appropriate. However, although some protocols permit the transmission of a small amount of data via random access uplink, some, notably LTE, do not. This means that the terminal must establish a link with the cell before it can transmit said credentials. This inconvenience is perhaps outweighed by the gain in security that results, since the network is able to verify the identity of the terminal before any sensitive information is transferred.

Figure 7:
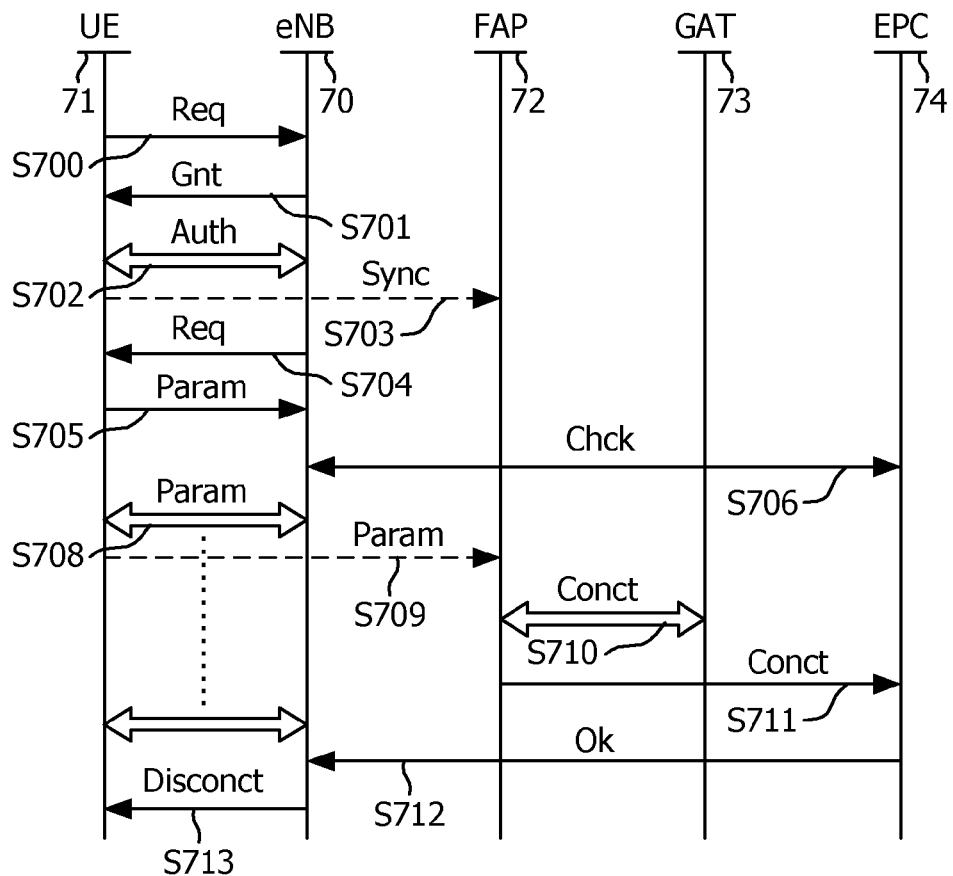
FIG. 7 is a schematic flow chart depicting steps of methods according to a third embodiment.

In the present embodiment, the method comprises the following steps, described with reference to FIG. 7.

The FAP 72 is firstly placed in a configuration mode.

Then, during a step S700, the user sends from its mobile terminal 71 a random access message requesting a link to a base station 70 of the operator's network for FAP configuration.

On receipt, the operator's network grants a secure connection during step S701 and sends a grant message. Then, the base station performs an authentication process during step S702.

In a parallel step S703, the FAP uses the messages exchanges during the authentication between the terminal and the base station in order to synchronise to the terminal.

On successful authentication, the base station requests the FAP identification and the parameters to the terminal during step S704.

The terminal replies during step S705 with the requested data.

Then, the Base station may contact the EPC 74 during step S705 in order to check whether the FAP is already connected to the operator's network.

If the FAP is not connected, then the base station transfers the parameters, for example using a pre-encryption scheme using a secret key or a public key method and the terminal echoes back the data to the base station. This dummy exchange of the parameters is performed during a step S708.

In parallel of the dummy exchange, the FAP listens to the echoed data during steps S709 and thereby obtains the parameters.

Then, when the FAP has received the necessary parameters for establishing the connection to the Gateway 73, it establishes the connection to the Gateway during step S710.

Once the connection to the gateway is performed, the FAP has access to the Internet network and is thus able to connect to the EPC 74 of the operator's network. The FAP then connects to the EPC during step S711. Then, the FAP is integrated to the operator's network under the control of the EPC as already discussed above.

When the EPC is contacted, it sends a message to the Base station during step S712 in order to inform the base station that the dummy exchange transfer of the parameters is not needed any longer and that it can stop the transfer.

Then, during step S713, the base station releases the communication with the terminal.

Variations on the steps are, possible. For example, frequency (or channel) synchronisation may be preferred, full time synchronisation may be unnecessary if the terminal is the only (or strongest) one that the FAP can receive.

Fourth Embodiment: Direct transfer

In this embodiment, transfer of credential information is achieved directly between a terminal 81 and a FAP 82 using a mechanism common to both that is limited in range in order to prevent interception or takeover by a third party. An infra-red light communications method in accordance with the published IrDA standard is one possible example. An inductive communications method exemplified by NFC and some RFID systems is another, and Cable-based approaches including USB is still another. In all cases, by placing the FAP into a temporary configuration mode (by, for example, power cycling or holding down a reset button), the said terminal is able to establish a short range link with said FAP and transfer credential information thereover. Mutual or one-way authentication is an optional feature that the short range and short window of opportunity may make redundant.

Figure 8:
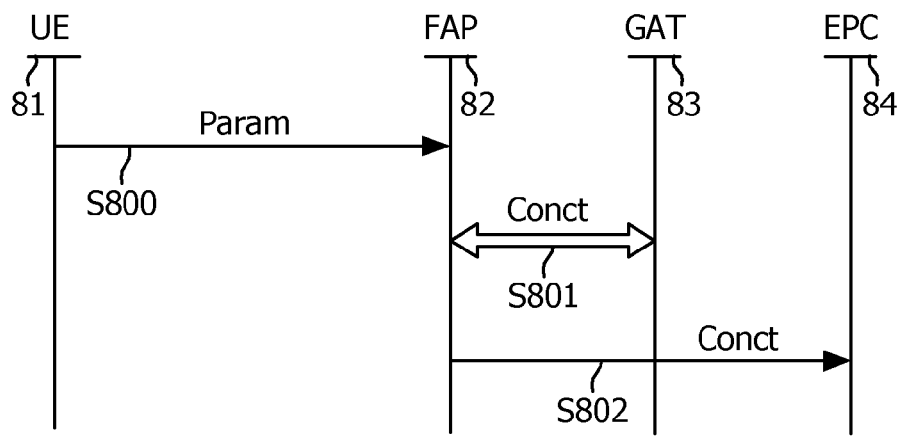
FIG. 8 is a schematic flow chart depicting steps of methods according to a fourth embodiment.

A illustrated by FIG. 8, this embodiment may comprise the following steps. During step S800, the terminal 81 directly transmits to the FAP the parameters needed for connecting to a gateway 83 using the short range links discussed above. Then, when the FAP has received the necessary parameters for establishing the connection to the Gateway 83, it establishes the connection to the Gateway during step S801.

Once the connection to the gateway is performed, the FAP has access to the Internet network and is thus able to connect to the EPC 84 of the operator's network. The FAP then connects to the EPC during step S802. Then, the FAP is integrated to the operator's network under the control of the EPC as already discussed above.

Embodiments of the present invention can be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after a conversion to another language. Such a computer program can be designed based on the diagrams ans flowchart of FIGS. 3-8, and the present description. The computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed may be combined without departing from the scope of the invention.

The invention claimed is:

1. A method of operating a femtocell device for installing the femtocell device in a radio telecommunications network, the method comprising the following acts:
   in the femtocell device:
   receiving, via a first communications unit, from a first mobile telecommunication device, a set of parameters comprising at least one connection parameter for connecting the femtocell device to a network access device,
   connecting, via a second communications unit, to receive from and transmit signals to the network access device according to the at least one connection parameter received from the first mobile telecommunication device, the network access device providing access to an Internet Protocol network, wherein the connection between the network access device and the Internet Protocol network is a wireless connection, and
   connecting, via a processing unit, to receive from and transmit signals to a first management unit controlling the radio telecommunications network, the connection via the network access device and Internet Protocol network, to integrate the femtocell device with the radio telecommunications network.

2. The method of claim 1, wherein the set of parameters is directly received from the first mobile telecommunication device.

3. The method of claim 1, wherein the set of parameters is received from the first mobile telecommunication device though a base station of the telecommunications network.

4. The method of claim 3, wherein the set of parameters is received from the first mobile telecommunication device through the base station and through a communication link between the base station and the femtocell device.

5. The method of claim 4, wherein the communication link is established upon receipt of a page message from the base station to the femtocell device.

6. The method of claim 3, wherein the set of parameters is received from the first mobile telecommunication device through the base station through a connectionless communication from the base station to the femtocell device.

7. The method of claim 5, wherein the establishment of the communication link by the base station is triggered by receipt by the base station of a message from a second mobile telecommunication device that indicates that the set of parameters is to be transmitted to the femtocell device.

8. A tangible computer program product comprising a computer readable medium, that is not a transitory propagating signal or wave, having thereon a computer program comprising program instructions, the computer program being loadable into the femtocell device and adapted to cause the femtocell device to execute the acts of the method according to claim 1 when the computer program is run by the femtocell device.

9. A femtocell device comprising:
   a first communication unit configured to receive, from a first mobile telecommunication device, a set of parameters comprising at least one connection parameter for connecting the femtocell device to a network access device,
   a second wireless communication unit configured to connect the femtocell device to transmit to and receive signals from the network access device using the at least one connection parameter, the network access device providing access to an Internet Protocol network, the connection between the network access device and the Internet Protocol network being a wireless connection, and
   a processing unit configured for connecting the femtocell device to transmit to and receive signals from a management unit to transmit and receive signals, the management unit controlling a radio telecommunications network, the connection using the network access device, the connection integrating the femtocell device with the radio telecommunications network.

10. The femtocell device of claim 9, wherein the first communication unit of the femtocell device is configured to receive the set of parameters directly from the first mobile telecommunication device.

11. The femtocell device of claim 9, wherein the first communication unit of the femtocell device is configured for receiving the set of parameters via a base station of the telecommunications network.

12. The femtocell device of claim 11, wherein the first communication unit of the femtocell device is configured for receiving the set of parameters via a communication link between the base station and the femtocell device.

13. The femtocell device claim 12, wherein the first communication unit of the femtocell device is configured to establish the communication link upon receipt of a page message from a base station.

14. The femtocell device of claim 11, wherein the first communication unit of the femtocell device is configured to receive the set of parameters from the first mobile telecommunication device through the base station via a connectionless communication from the base station to the femtocell device.

15. A radio telecommunications network comprising:
   a femtocell device comprising:
      a first communication unit configured to receive, from a mobile telecommunication device, a set of parameters comprising at least one connection parameter for connecting the femtocell device to a network access device
      a second wireless communication unit configured to connect the femtocell device to receive signals from and transmit signals to the network access device using the at least one connection parameter, the network access device providing access to an Internet Protocol network, wherein the connection between the network access device and the Internet Protocol network is a wireless connection, and
      a processing unit for connecting the femtocell device to receive signals from and transmit signals to a first management unit of a radio telecommunications network, using the network access device, in order to be integrated to said radio telecommunications network under control of the first management unit,
   a base station configured to communicate to receive and transmit signals to the femtocell device, and
   the first management unit configured to integrate the femtocell device with the radio telecommunications network managed by the management unit, and
   wherein the femtocell, the base station and the management unit are further configured for installing a femtocell device in the radio telecommunications network by performing a method including the acts of:
      receiving from the first mobile telecommunication device, the set of parameters comprising the at least one connection parameter for connecting the femtocell device to a network access device, connecting to the network access device according to the received set of parameters, the network access device providing access to an Internet Protocol network, wherein the connection between the network access device and the Internet Protocol network is a wireless connection, and connecting to the first management unit of the radio telecommunications network, via the Internet Protocol network to achieve integration , to the radio telecommunications network under control of the first management unit.

16. The radio telecommunications network of claim 15, wherein the set of parameters is directly received from the first mobile telecommunication device.

17. The radio telecommunications network of claim 15, wherein the set of parameters is received from the first mobile telecommunications device though a base station of the radio telecommunications network.

18. The radio telecommunications network of claim 17, wherein the set of parameters is received from the first mobile telecommunications device though the base station and through a communication link between the base station and the femtocell device.

19. The radio telecommunications network of claim 18, wherein the communication link is established upon receipt of a page message from the base station to the femtocell device.

20. The radio telecommunications network of claim 17, wherein the set of parameters is received from the first mobile telecommunication device through the base station through a connectionless communication from the base station to the femtocell device.

21. The radio telecommunications network claim 19, wherein establishing the communication link by the base station is triggered by receipt by the base station of a message from a second mobile telecommunication device that indicates that the set of parameters is to be transmitted to the femtocell device.

22. A radio telecommunications network comprising:
a network access device configured to provide access for receiving and sending signals to an Internet Protocol network, wherein the connection between the network access device and the Internet Protocol network is a wireless connection;
a first management unit configured to manage the telecommunications network;
a mobile telecommunications device configured to transmit parameters;
a femtocell device comprising:
a first communication unit configured to receive, from the mobile telecommunication device, a set of parameters comprising at least one connection parameter for connecting the femtocell device to a network access device;
a second wireless communication unit configured to connect the femtocell device to receive and transmit signals to the network access device using the at least one connection parameter; and
a processing unit configured to control the first management network and to connect the femtocell device to receive from and send signals to the first management unit, via the network access device, in order to integrate the femtocell device with the radio telecommunications network; and
a base station configured to communicate to receive signals from and send signals to the femtocell device.

* * * * *